(12) United States Patent
Yang

(10) Patent No.: US 11,395,362 B2
(45) Date of Patent: Jul. 19, 2022

(54) BEAM FAILURE EVENT HANDLING METHOD AND APPARATUS AND TERMINAL

(71) Applicant: VIVO MOBILE COMMUNICATION CO., LTD., Guangdong (CN)

(72) Inventor: Yu Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 22 days.

(21) Appl. No.: 16/968,243

(22) PCT Filed: Feb. 1, 2019

(86) PCT No.: PCT/CN2019/074406
§ 371 (c)(1),
(2) Date: Aug. 7, 2020

(87) PCT Pub. No.: WO2019/154319
PCT Pub. Date: Aug. 15, 2019

(65) Prior Publication Data
US 2021/0037590 A1    Feb. 4, 2021

(30) Foreign Application Priority Data
Feb. 9, 2018   (CN) .......................... 201810136628.2

(51) Int. Cl.
*H04W 76/19*    (2018.01)
*H04W 76/18*    (2018.01)
*H04W 74/08*    (2009.01)

(52) U.S. Cl.
CPC ....... *H04W 76/19* (2018.02); *H04W 74/0833* (2013.01); *H04W 76/18* (2018.02)

(58) Field of Classification Search
CPC .. H04W 76/18; H04W 76/19; H04W 74/0833
See application file for complete search history.

(56) References Cited

U.S. PATENT DOCUMENTS

2017/0331577 A1   11/2017  Parkvall et al.
2018/0006770 A1    1/2018  Guo et al.
2018/0368126 A1*  12/2018  Islam ................... H04L 5/1469
(Continued)

FOREIGN PATENT DOCUMENTS

CN        107567038 A     1/2018

OTHER PUBLICATIONS

Qualcomm Incorporated; "Remaining details on beam recovery procedure";3GPP TSG RAN WG1 Meeting AH 1801 Vancouver, Canada, Jan. 22-26, 2018; R1-1800860 (Year: 2018).*
(Continued)

*Primary Examiner* — Gary Mui
(74) *Attorney, Agent, or Firm* — Brooks Kushman P.C.

(57) ABSTRACT

Disclosed are a beam failure event handling method and apparatus and a terminal. The method includes: when it is determined to transmit a beam failure recovery request by using a contention based PRACH resource used for beam failure recovery request, selecting a target contention based PRACH resource from contention based PRACH resources used for beam failure recovery request; and transmitting the beam failure recovery request to a network device by using the target contention based PRACH resource.

19 Claims, 3 Drawing Sheets

--- if it is determined to transmit a beam failure recovery request by using a contention based PRACH resource used for beam failure recovery request, selecting a target contention based PRACH resource from contention based PRACH resources used for beam failure recovery request — 101 transmitting the beam failure recovery request to a network device by using the target contention based PRACH resource — 102

(56) References Cited

U.S. PATENT DOCUMENTS

| | | | | |
|---|---|---|---|---|
| 2019/0037423 | A1* | 1/2019 | Yu | H04W 74/0833 |
| 2019/0215897 | A1* | 7/2019 | Babaei | H04W 76/28 |
| 2019/0268790 | A1* | 8/2019 | Kwon | H04B 17/309 |
| 2020/0059285 | A1* | 2/2020 | Zhang | H04W 72/046 |
| 2020/0137801 | A1* | 4/2020 | Chen | H04W 74/006 |
| 2020/0177263 | A1* | 6/2020 | Zhang | H04W 74/02 |
| 2020/0205193 | A1* | 6/2020 | Amuru | H04W 52/36 |
| 2020/0214035 | A1* | 7/2020 | Chen | H04B 7/088 |
| 2020/0351860 | A1* | 11/2020 | Chen | H04B 7/0695 |
| 2021/0058129 | A1* | 2/2021 | Takeda | H04W 28/0278 |

OTHER PUBLICATIONS

First Office Action dated Jul. 6, 2020 issued in Chinese Application No. 201810136628.2.
3GPP TSG RAN WG1 Meeting AH 1801, R1-1800629, Vancouver, Canada, Jan. 22-26, 2018, "Remaining details on beam failure recovery", 3 pages.
International Preliminary Report on Patentability and Written Opinion dated Aug. 20, 2020 issued in PCT/CN2019/074406.
3GPP TSG RAN WG1#90 Meeting, R1-1713327, Prague, Czech Republic, Aug. 21-25, 2017, "Discussion on mechanisms for beam failure recovery", 7 pages.
3GPP TSG RAN WG1 Meeting #90b, R1-1718878, Prague, Czechia, Oct. 9-13, 2017, "Summary for Remaing issues on Beam Failure Recovery", 8 pages.
3GPP TSG RAN WG1 Meeting #AH1801, R1-1801197, Vancouver, CA, Jan. 22-Jan. 26, 2018, "Offline Summary for Remaing issues on Beam Failure Recovery", 9 pages.

* cited by examiner

BEAM FAILURE EVENT HANDLING METHOD AND APPARATUS AND TERMINAL

CROSS-REFERENCE TO RELATED APPLICATION

The present application is a U.S. national phase application of a PCT Application No. PCT/CN2019/074406 filed on Feb. 1, 2019, which claims a priority to the Chinese patent application No. 201810136628.2 filed in China on Feb. 9, 2018, the disclosures of which are incorporated in their entirety by reference herein.

TECHNICAL FIELD

The present disclosure relates to the field of communications techniques, in particular to a beam failure event handling method and apparatus and a terminal.

BACKGROUND

A beam failure recovery (Beam Failure Recovery, BFR) mechanism has been introduced into the 5th-Generation (5G) New Radio (NR) technology. In related art, when a beam failure event occurs and a candidate beam is available, the terminal, also called user equipment (UE) for example, uses a contention-free (or non-contention) physical random access channel (PRACH) resource to which this candidate beam is mapped to transmit a beam failure recovery request to a base station.

In the process of transmitting the beam failure recovery request to the base station, the terminal needs to transmit the beam failure recovery request based on a maximum number of beam failure recovery request transmissions or a timer configured by the network. If no response message is received from the base station when the timer at the media access control (MAC) layer of the terminal expires or the maximum number of beam failure recovery request transmissions is reached, then it is determined that beam failure recovery based on the contention-free PRACH is unsuccessful.

In this case, it is necessary to utilize a radio link failure process at a higher layer of the terminal to restore the connection between the terminal and the network. However, this process requires a contention-free random access PRACH resource and is time-consuming, which is unfavorable for quick beam recovery.

SUMMARY

It is an objective of embodiments of the present disclosure to provide a beam failure event handling method and apparatus and a terminal, so as to enable quick beam recovery.

To solve the foregoing technical problem, embodiments of the present disclosure are implemented as follows.

In a first aspect, a beam failure event handling method applied to a terminal is provided. The method includes: when it is determined to transmit a beam failure recovery request by using a contention based physical random access channel (PRACH) resource used for beam failure recovery request, selecting a target contention based PRACH resource from contention based PRACH resources used for beam failure recovery request; and transmitting the beam failure recovery request to a network device by using the target contention based PRACH resource.

In a second aspect, a beam failure event handling apparatus applied to a terminal is provided. The apparatus includes: a selection unit, configured to, in a case that it is determined to transmit a beam failure recovery request by using a contention based PRACH resource used for beam failure recovery request, select a target contention based PRACH resource from contention based PRACH resources used for beam failure recovery request; and a transmission unit, configured to transmit the beam failure recovery request to a network device by using the target contention based PRACH resource.

In a third aspect, a terminal is provided. The terminal includes a processor, a storage, and a beam failure event handling program stored in the storage and configured to be executed by the processor. The processor is configured to execute the beam failure event handling program to implement the steps of the beam failure event handling method described above.

In a fourth aspect, a computer readable storage medium is provided. The computer readable storage medium has a beam failure event handling program stored thereon. The beam failure event handling program is configured to be executed by a processor to implement the steps of the beam failure event handling method described above.

It can be seen from the technical solution provided by the embodiments of the present disclosure that the solution of the embodiments of the present disclosure has at least the technical effect as follows.

In embodiments of the present disclosure, a contention based PRACH resource can be introduced into the beam failure recovery process. In transmitting the beam failure recovery request to the network device by using the target contention based PRACH resource, the contention based PRACH resource and the contention-free PRACH resource are used in a mutually complementary way, to improve the success rate of the beam failure recovery, and try to complete the beam recovery before resorting to the radio link failure and re-establishment process. In this way, the time spent on recovery of the transmission between the terminal and the network can be shortened and the communication resource can be utilized more efficiently.

BRIEF DESCRIPTION OF THE DRAWINGS

In order to explain the technical solutions in the embodiments of this disclosure or related art more clearly, the drawings required in description of the embodiments or related art will be briefly described below. Apparently, the drawings in the following description illustrate merely some embodiments set forth in this disclosure, and other drawings can be obtained based on these drawings without any creative effort by those of ordinary skill in the art.

DETAILED DESCRIPTION

Figure 1:
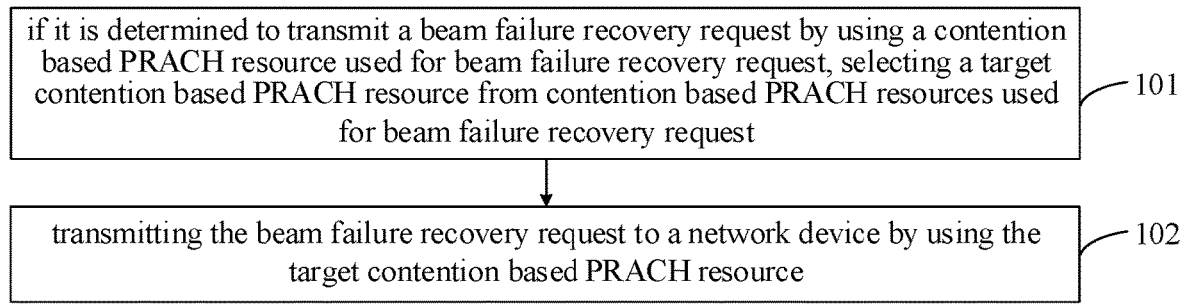
FIG. 1 is a flow diagram of a beam failure event handling method according to an embodiment of the present disclosure.

In order to facilitate a better understanding of the technical solutions in the present disclosure, the technical solutions in the embodiments of the present disclosure will be described clearly and completely with reference to the drawings in the embodiments of the present disclosure. Apparently, the embodiments described are only some of the embodiments of the present disclosure, but not all of them. Based on the embodiments in the present disclosure, any other embodiment obtained by those of ordinary skill in the art without any creative effort shall fall within the scope of the present disclosure.

It is appreciated that the technical solutions according to embodiments of the present disclosure are applicable to various communication systems, such as global system of mobile communication (GSM), code division multiple access (CDMA) system, wideband code division multiple access (WCDMA) system, general packet radio service (GPRS) system, long term evolution (LTE) system, frequency division duplex (FDD) system, time division duplex (TDD) system, universal mobile telecommunication system (UMTS), or worldwide interoperability for microwave access (WIMAX) communication system, 5G system, or New Radio (NR) system.

In embodiments of the present disclosure, the terminal may include, without limitation, a mobile station (MS), a mobile terminal, a mobile telephone, user equipment (UE), a handset, portable equipment, a vehicle, or the like. The terminal can communicate with one or more core networks over a radio access network (RAN). The terminal may be, for example, a mobile phone (also called cell phone), a computer with wireless communication functions, or the like. The terminal may also be a portable mobile device, a pocket mobile device, a handheld mobile device, a mobile device built in a computer, or a vehicle-mounted mobile device.

The network device related to embodiments of the present disclosure is an apparatus deployed in a radio access network and configured to provide the terminal with wireless communication functions. The network device may be a base station. The base station may include various forms, such as macro base station, micro base station, relay station, access point. In systems adopting different radio access techniques, the device having the function of a base station may be termed differently. For example, in an LTE network, it is called an evolved NodeB (eNB or eNodeB), in a 3rd generation (3G) network, it is called a Node B, and so on.

In embodiments of the present disclosure, a beam failure event handling method and apparatus and a terminal are provided. Hereinafter, the beam failure event handling method according to some embodiments of the present disclosure is introduced first. For ease of understanding, some concepts related to the embodiments of the present disclosure will be explained.

The physical random access channel (PRACH) resources can be categorized into contention-free PRACH resources (or contention free PRACH resources) and contention based PRACH resources. The contention-free PRACH resource refers to the PRACH resource used exclusively by a terminal, and the contention based PRACH resource refers to the PRACH resource shared between a terminal and other terminal. The contention based PRACH resources may be categorized into PRACH resources for initial access and contention based PRACH resources used for beam failure recovery request. The contention based PRACH resource used for beam failure recovery request refers to a PRACH resource used for transmission of a beam failure recovery request.

Beam failure event: the physical layer of a terminal measures a beam failure detection reference signal, and if it is detected that the measurement metrics of the serving beams for all control channels exceed a preset threshold, then it is determined that one beam failure instance occurs. At this time, the physical layer of the terminal reports, on a periodic basis, an indication to the media access control (MAC) layer of the terminal. Otherwise, if the physical layer of the terminal determines that no beam failure instance occurs, then no indication is sent to the MAC layer of the terminal. The MAC layer of the terminal counts the indications reported by the physical layer with a counter. Once the count value reaches a maximum number configured by the network, the terminal declares that a beam failure event occurs.

FIG. 1 is a flow diagram of a beam failure event handling method applied to a terminal according to an embodiment of the present disclosure. As shown in FIG. 1, this method may include the following steps.

Step 101: if it is determined to transmit a beam failure recovery request by using a contention based PRACH resource used for beam failure recovery request, selecting a target contention based PRACH resource from contention based PRACH resources used for beam failure recovery request.

In some embodiments of the present disclosure, the network configures a contention based PRACH resource used for beam failure recovery request for the terminal through higher-layer signaling. The contention based PRACH resource used for beam failure recovery request is used for transmission of a beam failure recovery request. Accordingly, the following steps may be added before the above Step 101: receiving radio resource control (RRC) signaling, where the RRC signaling carries configuration information for configuring the contention based PRACH resource used for beam failure recovery request; and determining the contention based PRACH resource used for beam failure recovery request based on the configuration information.

In some embodiments of the present disclosure, the contention based PRACH resource used for beam failure recovery request may be multiplexed with the PRACH resource for initial access through frequency division multiplexing (FDM), code division multiplexing (CDM), or time division multiplexing (TDM), and the contention based PRACH resource used for beam failure recovery request may be multiplexed with the contention-free PRACH resource through FDM, CDM, or TDM.

Considering that during transmission of information on the contention based PRACH resource used for beam failure recovery request, the information has to be transmitted according to certain configuration parameter, in some embodiments of the present disclosure, the network may configure the configuration parameter for the terminal through higher-layer signaling. In this case, the configuration parameter may include at least one of root sequence index, zero correlation zone, random access (RA)-preamble index config, preamble initial received target power, preamble transmission maximum number, and power ramping step.

In some embodiments of the present disclosure, it may be determined in various manners to transmit a beam failure recovery request by using a contention based PRACH resource used for beam failure recovery request.

Specifically, in a case that it is determined that beam failure recovery based on a contention-free PRACH resource is unsuccessful, it may be determined to transmit a beam failure recovery request by using a contention based PRACH resource used for beam failure recovery request.

Optionally, when it is configured to transmit a beam failure recovery request by using a contention based PRACH resource used for beam failure recovery request in the case of a beam failure event, it may be determined to transmit a beam failure recovery request by using a contention based PRACH resource used for beam failure recovery request.

Optionally, when indication information indicating that a beam failure recovery request is to be transmitted by using a contention based PRACH resource used for beam failure recovery request is received in the case of a beam failure event, it may be determined to transmit a beam failure recovery request by using a contention based PRACH resource used for beam failure recovery request.

Optionally, if it is determined that no contention-free PRACH resource is configured and a contention based PRACH resource used for beam failure recovery request is configured in the case of a beam failure event, it may be determined to transmit a beam failure recovery request by using a contention based PRACH resource used for beam failure recovery request.

Optionally, the terminal may determine autonomously to transmit a beam failure recovery request by using a contention based PRACH resource used for beam failure recovery request in the case of a beam failure event. No limitation is made in this respect in the embodiments of the present disclosure.

Step 102: transmitting the beam failure recovery request to a network device by using the target contention based PRACH resource.

For example, the network configures ten contention based PRACH resources for the terminal, among which four are contention based PRACH resources used for beam failure recovery request and six are PRACH resources for initial access. When it is determined to transmit a beam failure recovery request by using a contention based PRACH resource used for beam failure recovery request, the terminal selects one contention based PRACH resource used for beam failure recovery request from the four contention based PRACH resources used for beam failure recovery request as the target contention based PRACH resource, and transmits the beam failure recovery request to the base station by using this target contention based PRACH resource.

Considering that upon receiving the beam failure recovery request, the network device transmits a response message carrying a cell radio network temporary identifier (C-RNTI) over a dedicated PDCCH in the control resource set-beam failure recovery (CORESET-BFR), in order to enable the terminal to receive this response message in time, in some embodiments of the present disclosure, after transmitting the beam failure recovery request to the network device by using the target contention based PRACH resource, the terminal can monitor the response message corresponding to the beam failure recovery request on the response dedicated resource in the CORESET-BFR. The CORESET-BFR is a control resource set for transmission of the response message corresponding to the beam failure recovery request.

It can be seen from the above embodiment that, in this embodiment, the contention based PRACH resource can be introduced into the beam failure recovery process. In transmitting the beam failure recovery request to the network device by using the target contention based PRACH resource, the contention based PRACH resource and the contention-free PRACH resource are used in a mutually complementary way, to improve the success rate of the beam failure recovery, and try to complete the beam recovery before resorting to the radio link failure and re-establishment process. In this way, the time spent on recovery of the transmission between the terminal and the network can be shortened and the communication resource can be utilized more efficiently.

Figure 2:
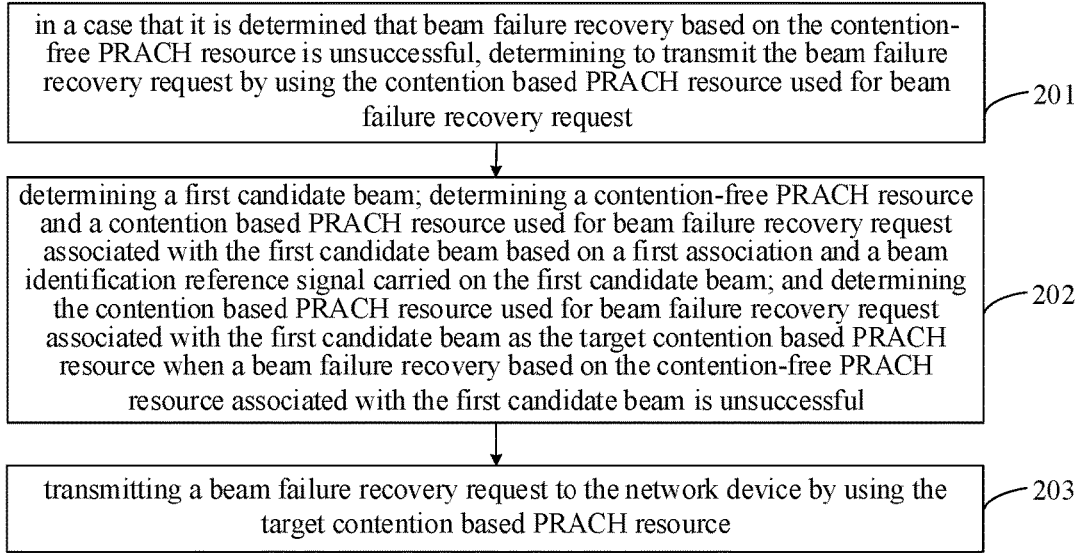
FIG. 2 is another flow diagram of a beam failure event handling method according to an embodiment of the present disclosure.

FIG. 2 is another flow diagram of a beam failure event handling method according to an embodiment of the present disclosure. In the embodiment of the present disclosure, in a case that it is determined that beam failure recovery based on the contention-free PRACH resource is unsuccessful, it may be determined to transmit the beam failure recovery request by using the contention based PRACH resource used for beam failure recovery request. In this case, as shown in FIG. 2, this method may include the following steps.

Step 201: in a case that it is determined that beam failure recovery based on the contention-free PRACH resource is unsuccessful, determining to transmit the beam failure recovery request by using the contention based PRACH resource used for beam failure recovery request.

In some embodiments of the present disclosure, it may be determined in various manners that beam failure recovery based on the contention-free PRACH resource is unsuccessful.

Specifically, in a case that the beam failure recovery request is transmitted to the network device by using the contention-free PRACH resource, if a first timer expires and no response message is received from the network device, then it is determined that beam failure recovery based on the contention-free PRACH resource is unsuccessful, wherein the first timer starts when the beam failure event occurs or the beam failure recovery request is transmitted by using the contention-free PRACH resource for the first time.

Optionally, in a case that the beam failure recovery request is transmitted to the network device by using the contention-free PRACH resource, if the first number counted by the first counter reaches a preset number of transmissions and no response message is received from the network device, then it is determined that beam failure recovery based on the contention-free PRACH resource is unsuccessful, wherein the first number is a number of times the terminal transmits the beam failure recovery request by using the contention-free PRACH resource.

Step 202: determining a first candidate beam; determining a contention-free PRACH resource and a contention based PRACH resource used for beam failure recovery request associated with the first candidate beam based on a first association and a beam identification reference signal carried on the first candidate beam; and determining the contention based PRACH resource used for beam failure recovery request associated with the first candidate beam as the target contention based PRACH resource when a beam failure recovery based on the contention-free PRACH resource associated with the first candidate beam is unsuccessful, wherein the first association includes an association between the beam identification reference signal and the contention-free PRACH resource and an association between the beam identification reference signal and the contention based PRACH resource used for beam failure recovery request, and the first association is determined by the terminal based on a network configuration or a preset protocol.

In some embodiments of the present disclosure, the terminal can determine the first candidate beam through measurement of the beam identification reference signal (beam identification RS) or according to the network configuration. Specifically, the physical layer of the terminal obtains a plurality of beam identification reference signals through measurement or according to the network configuration. Upon receiving a request, an indication, or a notification from a higher layer of the terminal, the physical layer of the terminal reports beam identification reference signals of a signal quality greater than a reference signal received power threshold to the higher layer of the terminal. The higher layer of the terminal determines a first candidate beam based on the report from the physical layer. The higher layer of the terminal usually determines a beam corresponding to the beam identification reference signal of the best signal quality as the first candidate beam.

Step 203: transmitting a beam failure recovery request to the network device by using the target contention based PRACH resource.

In some embodiments of the present disclosure, a timer may be used for both the contention-free PRACH resource and the contention based PRACH resource, and a counter may be used for both the contention-free PRACH resource and the contention based PRACH resource. In this case, the beam failure event handling method provided by the embodiment of the present disclosure may further include the following steps.

When beam failure recovery based on the contention-free PRACH resource is unsuccessful, restarting the first timer, and if the first timer expires and no response message is received from the network device, then determining that beam failure recovery based on the contention based PRACH resource used for beam failure recovery request is unsuccessful.

Optionally, when the beam failure recovery request is transmitted by using the target contention based PRACH resource for the first time, restarting the first timer, and if the first timer expires and no response message is received from the network device, then determining that beam failure recovery based on the contention based PRACH resource used for beam failure recovery request is unsuccessful.

Optionally, when beam failure recovery based on the contention-free PRACH resource is unsuccessful, starting the first counter to count a number of times the terminal transmits the beam failure recovery request by using the target contention based PRACH resource, and if the second number counted by the first counter reaches the preset number of transmissions, and no response message is received from the network device, then determining that beam failure recovery based on the contention based PRACH resource used for beam failure recovery request is unsuccessful.

Optionally, when the beam failure recovery request is transmitted by using the target contention based PRACH resource for the first time, starting the first counter to count a number of times the terminal transmits the beam failure recovery request by using the target contention based PRACH resource, and if the second number counted by the first counter reaches the preset number of transmissions, and no response message is received from the network device, then determining that beam failure recovery based on the contention based PRACH resource used for beam failure recovery request is unsuccessful, wherein the second number is a number of times the terminal transmits the beam failure recovery request by using the target contention based PRACH resource.

In some embodiments of the present disclosure, different timers may be used for the contention-free PRACH resource and the contention based PRACH resource, and different counters may be used for the contention-free PRACH resource and the contention based PRACH resource. Specifically, a first timer and a first counter are used for the contention-free PRACH resource, and a second timer and a second counter are used for the contention based PRACH resource. In this case, the beam failure event handling method provided by the embodiment of the present disclosure may further include the following steps.

When beam failure recovery based on the contention-free PRACH resource is unsuccessful, starting the second timer, and if the second timer expires and no response message is received from the network device, then determining that beam failure recovery based on the contention based PRACH resource used for beam failure recovery request is unsuccessful.

Optionally, when the beam failure recovery request is transmitted by using the target contention based PRACH resource for the first time, starting the second timer, and if the second timer expires and no response message is received from the network device, then determining that beam failure recovery based on the contention based PRACH resource used for beam failure recovery request is unsuccessful.

Optionally, when beam failure recovery based on the contention-free PRACH resource is unsuccessful, starting the second counter to count a number of times the terminal transmits the beam failure recovery request by using the target contention based PRACH resource, and if a third number counted by the second counter reaches the preset number of transmissions and no response message is received from the network device, then determining that beam failure recovery based on the contention based PRACH resource used for beam failure recovery request is unsuccessful.

Optionally, when the beam failure recovery request is transmitted by using the target contention based PRACH resource for the first time, starting the second counter to count a number of times the terminal transmits the beam failure recovery request by using the target contention based PRACH resource, and if the third number counted by the second counter reaches the preset number of transmissions and no response message is received from the network device, then determining that beam failure recovery based on the contention based PRACH resource used for beam failure recovery request is unsuccessful, wherein the third number is a number of times the terminal transmits the beam failure recovery request by using the target contention based PRACH resource.

It can be seen from the above embodiment that, in this embodiment, when beam failure recovery based on the contention-free PRACH resource is unsuccessful, the beam failure recovery request is transmitted to the network device by using the target contention based PRACH resource, such that the contention based PRACH resource and the contention-free PRACH resource are used in a mutually complementary way, to improve the success rate of the beam failure recovery, and try to complete the beam recovery before resorting to the radio link failure and re-establishment process. In this way, the time spent on recovery of the transmission between the terminal and the network can be shortened and the communication resource can be utilized more efficiently.

Figure 3:
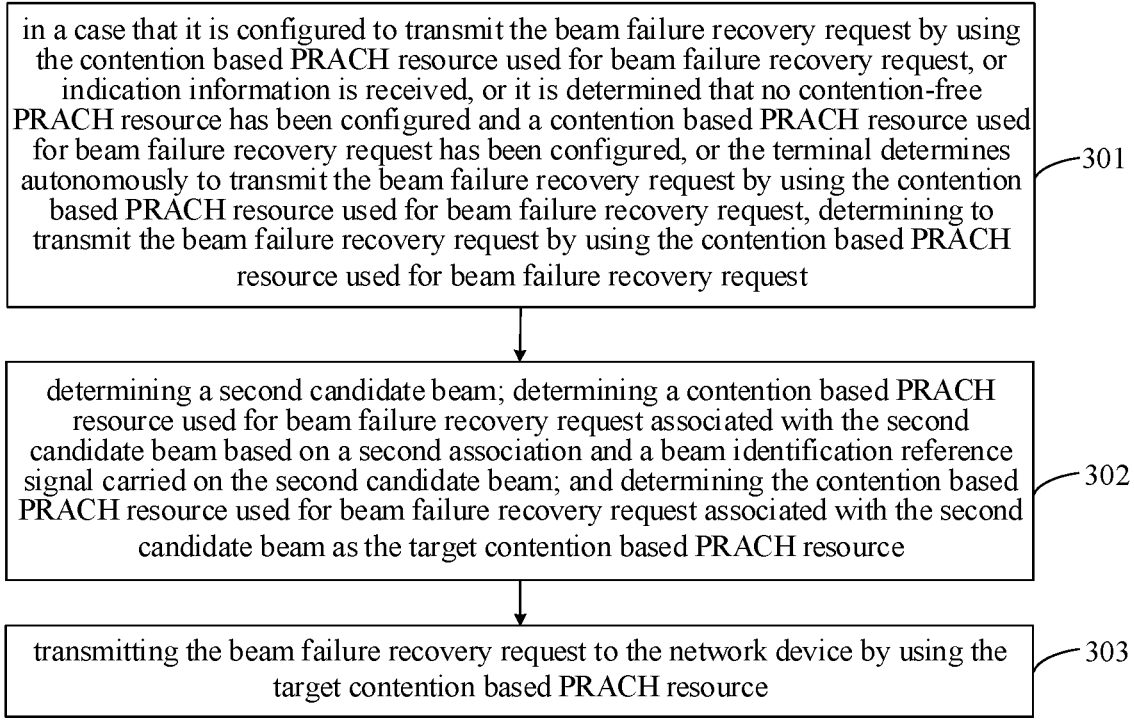
FIG. 3 is still another flow diagram of a beam failure event handling method according to an embodiment of the present disclosure.

FIG. 3 is still another flow diagram of a beam failure event handling method according to an embodiment of the present disclosure. In the embodiment of the present disclosure, in the case of a beam failure event, the beam failure recovery request can be transmitted by using the contention based PRACH resource used for beam failure recovery request directly. In this case, as shown in FIG. 3, this method may include the following steps.

Step 301: in a case that it is configured to transmit the beam failure recovery request by using the contention based PRACH resource used for beam failure recovery request, or indication information is received, or it is determined that no contention-free PRACH resource is configured and a contention based PRACH resource used for beam failure recovery request is configured, or the terminal determines autonomously to transmit the beam failure recovery request by using the contention based PRACH resource used for beam failure recovery request, determining to transmit the beam failure recovery request by using the contention based PRACH resource used for beam failure recovery request. The indication information is used to indicate to the terminal that the beam failure recovery request is to be transmitted by using the contention based PRACH resource used for beam failure recovery request.

In some embodiments of the present disclosure, in a case that it is configured that a beam failure recovery request is to be transmitted by using a contention based PRACH resource used for beam failure recovery request in the case of a beam failure event, it may be determined to transmit the beam failure recovery request by using a contention based PRACH resource used for beam failure recovery request.

Optionally, when indication information indicating that a beam failure recovery request is to be transmitted by using a contention based PRACH resource used for beam failure recovery request is received in the case of a beam failure event, it may be determined to transmit a beam failure recovery request by using a contention based PRACH resource used for beam failure recovery request.

Optionally, in a case that it is determined that no contention-free PRACH resource is configured and a contention based PRACH resource used for beam failure recovery request is configured in the case of a beam failure event, it may be determined to transmit a beam failure recovery request by using a contention based PRACH resource used for beam failure recovery request.

Optionally, the terminal may determine autonomously to transmit a beam failure recovery request by using a contention based PRACH resource used for beam failure recovery request in the case of a beam failure event. No limitation is made in this respect in the embodiments of the present disclosure.

Step 302: determining a second candidate beam; determining a contention based PRACH resource used for beam failure recovery request associated with the second candidate beam based on a second association and a beam identification reference signal carried on the second candidate beam; and determining the contention based PRACH resource used for beam failure recovery request associated with the second candidate beam as the target contention based PRACH resource. The second association includes the association between the beam identification reference signal and the contention based PRACH resource used for beam failure recovery request. The second association is determined by the terminal based on a network configuration or a preset protocol.

In the embodiment of the present disclosure, the terminal can determine the second candidate beam through measurement of the beam identification reference signal or according to the network configuration. Specifically, the physical layer of the terminal obtains a plurality of beam identification reference signals through measurement or according to the network configuration. Upon receiving a request, an indication, or a notification from a higher layer of the terminal, the physical layer of the terminal reports beam identification reference signals of a signal quality greater than a reference signal received power threshold to the higher layer of the terminal. The higher layer of the terminal determines a second candidate beam based on the report from the physical layer. The higher layer of the terminal usually determines a beam corresponding to the beam identification reference signal of the best signal quality as the second candidate beam.

Step 303: transmitting the beam failure recovery request to the network device by using the target contention based PRACH resource.

In some embodiments of the present disclosure, a third timer and/or a third counter are provided. In this case, the beam failure event handling method provided by the embodiment of the present disclosure may further include the following steps.

When a beam failure event occurs, starting the third timer, and if the third timer expires and no response message is received from the network device, then determining that beam failure recovery based on the contention based PRACH resource used for beam failure recovery request is unsuccessful.

Optionally, when the beam failure recovery request is transmitted by using the target contention based PRACH resource for the first time, starting the third timer, and if the third timer expires and no response message is received from the network device, then determining that beam failure recovery based on the contention based PRACH resource used for beam failure recovery request is unsuccessful.

Optionally, when a beam failure event occurs, starting the third counter to count a number of times the terminal transmits the beam failure recovery request by using the target contention based PRACH resource, and if a fourth number counted by the third counter reaches the preset number of transmissions and no response message is received from the network device, then determining that beam failure recovery based on the contention based PRACH resource used for beam failure recovery request is unsuccessful.

Optionally, when the beam failure recovery request is transmitted by using the target contention based PRACH resource for the first time, starting the third counter to count a number of times the terminal transmits the beam failure recovery request by using the target contention based PRACH resource, and if the fourth number counted by the third counter reaches the preset number of transmissions and no response message is received from the network device, then determining that beam failure recovery based on the contention based PRACH resource used for beam failure recovery request is unsuccessful, wherein the fourth number is a number of times the terminal transmits the beam failure recovery request by using the target contention based PRACH resource.

It can be seen from the above embodiment that, in this embodiment, in the case of a beam failure event, a beam failure recovery request may be transmitted to the network device by using the target contention based PRACH resource directly, such that the contention based PRACH resource and the contention-free PRACH resource are used in a mutually complementary way, to improve the success rate of the beam failure recovery, and try to complete the beam recovery before resorting to the radio link failure and re-establishment process. In this way, the time spent on recovery of the transmission between the terminal and the network can be shortened and the communication resource can be utilized more efficiently.

Figure 4:
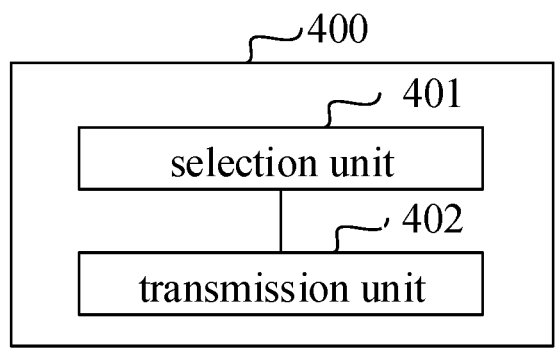
FIG. 4 is a schematic structural diagram of a beam failure event handling apparatus according to an embodiment of the present disclosure.

FIG. 4 is a schematic structural diagram of a beam failure event handling apparatus applied to a terminal according to an embodiment of the present disclosure. As shown in FIG. 4, the beam failure event handling apparatus 400 may include a selection unit 401 and a transmission unit 402.

The selection unit 401 is configured to, in a case that it is determined to transmit a beam failure recovery request by using a contention based PRACH resource used for beam failure recovery request, select a target contention based PRACH resource from contention based PRACH resources used for beam failure recovery request.

The transmission unit 402 is configured to transmit the beam failure recovery request to the network device by using the target contention based PRACH resource.

It can be seen from the above embodiment that, in this embodiment, a contention based PRACH resource can be introduced into the beam failure recovery process. In transmitting the beam failure recovery request to the network device by using the target contention based PRACH resource, the contention based PRACH resource and the contention-free PRACH resource are used in a mutually complementary way, to improve the success rate of the beam failure recovery, and try to complete the beam recovery before resorting to the radio link failure and re-establishment process. In this way, the time spent on recovery of the transmission between the terminal and the network can be shortened and the communication resource can be utilized more efficiently.

Optionally, in an embodiment, the beam failure event handling apparatus 400 may further include a first determination unit configured to, in a case that it is determined that beam failure recovery based on a contention-free PRACH resource is unsuccessful, determine to transmit the beam failure recovery request by using the contention based PRACH resource used for beam failure recovery request.

Optionally, in an embodiment, the beam failure event handling apparatus 400 may further include a second determination unit configured to, in a case that the beam failure recovery request is transmitted to the network device by using the contention-free PRACH resource, if the first timer expires and no response message is received from the network device or if the first number counted by the first counter reaches the preset number of transmissions and no response message is received from the network device, determine that beam failure recovery based on the contention-free PRACH resource is unsuccessful.

The first timer starts when a beam failure event occurs or when the beam failure recovery request is transmitted by using the contention-free PRACH resource for the first time. The first number is a number of times the terminal transmits the beam failure recovery request by using the contention-free PRACH resource.

Optionally, in an embodiment, the beam failure event handling apparatus 400 may further include: a third determination unit configured to, when beam failure recovery based on the contention-free PRACH resource is unsuccessful, or when the beam failure recovery request is transmitted by using the target contention based PRACH resource for the first time, restart the first timer; and if the first timer expires and no response message is received from the network device, determine that beam failure recovery based on the contention based PRACH resource used for beam failure recovery request is unsuccessful; or a fourth determination unit configured to, when beam failure recovery based on the contention-free PRACH resource is unsuccessful, or when the beam failure recovery request is transmitted by using the target contention based PRACH resource for the first time, start the first counter to count a number of times the terminal transmits the beam failure recovery request by using the target contention based PRACH resource, and if the second number counted by the first counter reaches the preset number of transmissions, and no response message is received from the network device, determine that beam failure recovery based on the contention based PRACH resource used for beam failure recovery request is unsuccessful.

The second number is a number of times the terminal transmits the beam failure recovery request by using the target contention based PRACH resource.

Optionally, in an embodiment, the beam failure event handling apparatus 400 may further include: a fifth determination unit configured to, when beam failure recovery based on the contention-free PRACH resource is unsuccessful, or when the beam failure recovery request is transmitted by using the target contention based PRACH resource for the first time, start the second timer; and if the second timer expires and no response message is received from the network device, determine that beam failure recovery based on the contention based PRACH resource used for beam failure recovery request is unsuccessful; or a sixth determination unit configured to, when beam failure recovery based on the contention-free PRACH resource is unsuccessful, or when the beam failure recovery request is transmitted by using the target contention based PRACH resource for the first time, start the second counter to count a number of times the terminal transmits the beam failure recovery request by using the target contention based PRACH resource, and if the third number counted by the second counter reaches the preset number of transmissions and no response message is received from the network device, determine that beam failure recovery based on the contention based PRACH resource used for beam failure recovery request is unsuccessful.

The third number is a number of times the terminal transmits the beam failure recovery request by using the target contention based PRACH resource.

Optionally, in an embodiment, the selection unit 402 may further include: a first candidate beam determination subunit configured to determine a first candidate beam; a first PRACH resource determination subunit configured to, based on the first association and the beam identification reference signal carried on the first candidate beam, determine the contention-free PRACH resource and the contention based PRACH resource used for beam failure recovery request associated with the first candidate beam, wherein the first association includes an association between the beam identification reference signal and the contention-free PRACH resource and an association between the beam identification reference signal and the contention based PRACH resource used for beam failure recovery request, and the first association is determined by the terminal based on a network configuration or a preset protocol; and a first target contention based PRACH resource determination subunit configured to, in a case that beam failure recovery based on the contention-free PRACH resource associated with the first candidate beam is unsuccessful, determine the contention based PRACH resource used for beam failure recovery request associated with the first candidate beam as the target contention based PRACH resource.

Optionally, in an embodiment, the beam failure event handling apparatus 400 may further include: a seventh determination unit configured to, in a case that it is configured to transmit the beam failure recovery request by using the contention based PRACH resource used for beam failure recovery request, determine to transmit the beam failure recovery request by using the contention based PRACH resource used for beam failure recovery request; or an eighth determination unit configured to, when indication information is received, determine to transmit the beam failure recovery request by using the contention based PRACH resource used for beam failure recovery request, wherein the indication information is used to indicate to the terminal that the beam failure recovery request is to be transmitted by using the contention based PRACH resource used for beam failure recovery request; or a ninth determination unit configured to, in a case that it is determined that no contention-free PRACH resource is configured and the contention based PRACH resource used for beam failure recovery request is configured, determine to transmit the beam failure recovery request by using the contention based PRACH resource used for beam failure recovery request; or a tenth determination unit configured to determine autonomously to transmit the beam failure recovery request by using the contention based PRACH resource used for beam failure recovery request.

Optionally, in an embodiment, the selection unit 402 may include: a second candidate beam determination subunit configured to determine a second candidate beam; and a second PRACH resource determination subunit, configured to, based on the second association and the beam identification reference signal carried on the second candidate beam, determine the contention based PRACH resource used for beam failure recovery request associated with the second candidate beam, wherein the second association includes the association between the beam identification reference signal and the contention based PRACH resource used for beam failure recovery request, and the second association is determined by the terminal based on a network configuration or a preset protocol; and a second target contention based PRACH resource determination subunit configured to determine the contention based PRACH resource used for beam failure recovery request associated with the second candidate beam as the target contention based PRACH resource.

Optionally, in an embodiment, the beam failure event handling apparatus 400 may further include: an eleventh determination unit configured to, when a beam failure event occurs, or when the beam failure recovery request is transmitted by using the target contention based PRACH resource for the first time, start the third timer, and if the third timer expires and no response message is received from the network device, determine that beam failure recovery based on the contention based PRACH resource used for beam failure recovery request is unsuccessful; or a twelfth determination unit configured to, when a beam failure event occurs, or the beam failure recovery request is transmitted by using the target contention based PRACH resource for the first time, start the third counter to count a number of times the terminal transmits the beam failure recovery request by using the target contention based PRACH resource, and if a fourth number counted by the third counter reaches the preset number of transmissions and no response message is received from the network device, determine that beam failure recovery based on the contention based PRACH resource used for beam failure recovery request is unsuccessful.

The fourth number is a number of times the terminal transmits the beam failure recovery request by using the target contention based PRACH resource.

Optionally, in an embodiment, the beam failure event handling apparatus 400 may further include a monitoring unit configured to monitor the response message corresponding to the beam failure recovery request on the response dedicated resource in the CORESET-BFR.

Optionally, in an embodiment, the configuration parameter of the contention based PRACH resource used for beam failure recovery request may include at least one of root sequence index, zero correlation zone, RA-preamble index config, preamble initial received target power, preamble transmission maximum number, and power ramping step.

Optionally, in an embodiment, the contention based PRACH resource used for beam failure recovery request may be multiplexed with the PRACH resource for initial access through FDM, CDM, or TDM, and the contention based PRACH resource used for beam failure recovery request may be multiplexed with the contention-free PRACH resource through FDM, CDM, or TDM.

Optionally, in an embodiment, the beam failure event handling apparatus 400 may further include: a receiving unit configured to receive RRC signaling carrying configuration information for configuring the contention based PRACH resource used for beam failure recovery request; and a thirteenth determination unit configured to determine the contention based PRACH resource used for beam failure recovery request based on the configuration information.

Figure 5:
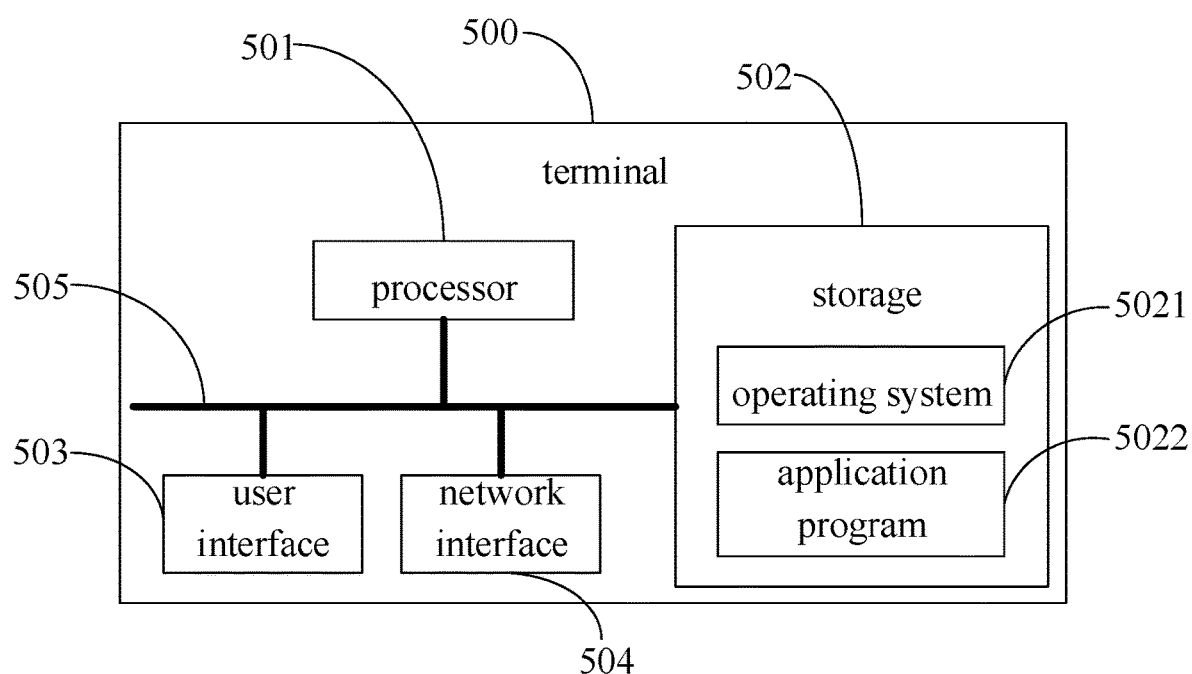
FIG. 5 is a schematic structural diagram of a terminal according to an embodiment of the present disclosure.

FIG. 5 is a schematic structural diagram of a terminal according to an embodiment of the present disclosure. The terminal 500 shown in FIG. 5 includes at least one processor 501, a storage 502, at least one network interface 504, and a user interface 503. Various components in the terminal 500 are coupled through a bus system 505. It is appreciated that the bus system 505 is configured to implement connective communication between these components. In addition to a data bus, the bus system 505 also includes a power bus, a control bus, and a status signal bus. For the sake of clarity, however, the various busses are all designated as the bus system 505 in FIG. 5.

The user interface 503 may include a display, a keyboard, or a point-and-click device (such as a mouse, a trackball, a touchpad, or a touch screen), and the like.

It is appreciated that the storage 502 in some embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) that serves as an external cache. By way of example and without limitation, numerous forms of RAM are available, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct rambus RAM (DRRAM). The storage 502 of the system and method according to the embodiments of the present disclosure is intended to include, without limitation, these and any other suitable types of storages.

In some implementations, the storage 502 stores the following elements: an executable module or a data structure, or a subset thereof, or an extension set thereof, i.e., an operating system 5021 and an application program 5022.

The operating system 5021 includes various system programs, such as a framework layer, a core library layer, a driver layer, and the like, and is configured to implement various basic services and handle hardware-based tasks. The application program 5022 includes various application programs, such as a media player, a browser, and the like, and is configured to implement various application services. The programs for implementing the method according to the embodiments of the present disclosure may be included in the application program 5022.

In the embodiments of the present disclosure, the terminal 500 further includes a beam failure event handling program stored in the storage 502 and configured to be executed by the processor 501. The beam failure event handling program, when executed by the processor 501, implements the following steps: when it is determined to transmit a beam failure recovery request by using a contention based PRACH resource used for beam failure recovery request, selecting a target contention based PRACH resource from contention based PRACH resources used for beam failure recovery request; and transmitting the beam failure recovery request to the network device by using the target contention based PRACH resource.

The method disclosed in the above embodiments of the present disclosure can be applied to the processor 501 or implemented by the processor 501. The processor 501 may be an integrated circuit chip having signal processing capabilities. During implementation, the various steps in the above method may be accomplished by hardware integrated logic circuit in the processor 501 or instructions in the form of a software. The processor 501 may be a general-purpose processor, a digital signal processor (DSP), an application specific integrated circuit (ASIC), a field programmable gate array (FPGA), or other programmable logic devices, discrete gates or transistor logic devices, discrete hardware components, that can implement or perform various methods, steps, and logic block diagrams disclosed in the embodiments of the present disclosure. The general-purpose processor may be a microprocessor, or may be any conventional processor, etc. The steps of the method disclosed in conjunction with the embodiments of the present disclosure may be implemented directly by a hardware decoding processor or by a combination of hardware in the decoding processor and software modules. The software module may reside in computer readable storage media well known in the art, such as a random access memory, a flash memory, a read-only memory, a programmable read-only memory, an electrically erasable and programmable memory, or a register. The computer readable storage medium resides in the storage 502. The processor 501 reads information from the storage 502 and accomplishes the steps of the above method by using hardware thereof. Specifically, the computer readable storage medium has a computer program stored thereon that, when executed by the processor 501, implements various steps of the embodiments of beam failure event handling method described above.

It is appreciated that these embodiments described in the present disclosure can be implemented in hardware, software, firmware, middleware, micro codes, or a combination thereof. For hardware implementation, the processing unit may be implemented in one or more application specific integrated circuits (ASICs), digital signal processors (DSPs), DSP devices (DSPDs), programmable logic devices (PLDs), field-programmable gate arrays (FPGAs), general-purpose processors, controllers, microcontrollers, microprocessors, other electronic units for performing the functions described in the present disclosure, or a combination thereof.

For software implementation, the techniques described in the embodiments of the present disclosure can be implemented by modules (such as processes, functions) performing the functions described in the embodiments of the present disclosure. Software codes can be stored in the storage and executed by the processor. The storage can be implemented internal or external to the processor.

Further, the computer program, when executed by the processor 501 can implement the following steps.

Optionally, in an embodiment, the method further includes: in a case that it is determined that beam failure recovery based on the contention-free PRACH resource is unsuccessful, determining to transmit the beam failure recovery request by using the contention based PRACH resource used for beam failure recovery request.

Optionally, in an embodiment, the method further includes: in a case that the beam failure recovery request is transmitted to the network device by using the contention-free PRACH resource, if the first timer expires and no response message is received from the network device or if the first number counted by the first counter reaches the preset number of transmissions and no response message is received from the network device, then determining that beam failure recovery based on the contention-free PRACH resource is unsuccessful.

The first timer starts when a beam failure event occurs or when the beam failure recovery request is transmitted by using the contention-free PRACH resource for the first time, and the first number is a number of times the terminal transmits the beam failure recovery request by using the contention-free PRACH resource.

Optionally, in an embodiment, the method further includes: when beam failure recovery based on the contention-free PRACH resource is unsuccessful or when the beam failure recovery request is transmitted by using the target contention based PRACH resource for the first time, restarting the first timer, and if the first timer expires and no response message is received from the network device, then determining that beam failure recovery based on the contention based PRACH resource used for beam failure recovery request is unsuccessful; or when beam failure recovery based on the contention-free PRACH resource is unsuccessful, or the beam failure recovery request is transmitted by using the target contention based PRACH resource for the first time, starting the first counter to count a number of times the terminal transmits the beam failure recovery request by using the target contention based PRACH resource, and if the second number counted by the first counter reaches the preset number of transmissions and no response message is received from the network device, then determining that beam failure recovery based on the contention based PRACH resource used for beam failure recovery request is unsuccessful, wherein the second number is a number of times the terminal transmits the beam failure recovery request by using the target contention based PRACH resource.

Optionally, in an embodiment, the method further includes: when beam failure recovery based on the contention-free PRACH resource is unsuccessful, or when the beam failure recovery request is transmitted by using the target contention based PRACH resource for the first time, starting the second timer, and if the second timer expires and no response message is received from the network device, then determining that beam failure recovery based on the contention based PRACH resource used for beam failure recovery request is unsuccessful; or when beam failure recovery based on the contention-free PRACH resource is unsuccessful, or when the beam failure recovery request is transmitted by using the target contention based PRACH resource for the first time, starting the second counter to count a number of times the terminal transmits the beam failure recovery request by using the target contention based PRACH resource, and if the third number counted by the second counter reaches the preset number of transmissions and no response message is received from the network device, then determining that beam failure recovery based on the contention based PRACH resource used for beam failure recovery request is unsuccessful, wherein the third number is a number of times the terminal transmits the beam failure recovery request by using the target contention based PRACH resource.

Optionally, in an embodiment, the selecting a target contention based PRACH resource from contention based PRACH resources used for beam failure recovery request includes: determining a first candidate beam; determining a contention-free PRACH resource and a contention based PRACH resource used for beam failure recovery request associated with the first candidate beam based on a first association and a beam identification reference signal carried on the first candidate beam, wherein the first association includes an association between the beam identification reference signal and the contention-free PRACH resource and an association between the beam identification reference signal and the contention based PRACH resource used for beam failure recovery request, and the first association is determined by the terminal based on a network configuration or a preset protocol; and determining the contention based PRACH resource used for beam failure recovery request associated with the first candidate beam as the target contention based PRACH resource when a beam failure recovery based on the contention-free PRACH resource associated with the first candidate beam is unsuccessful.

Optionally, in an embodiment, the method further includes: in a case that it is configured to transmit the beam failure recovery request by using the contention based PRACH resource used for beam failure recovery request, determining to transmit the beam failure recovery request by using the contention based PRACH resource used for beam failure recovery request; or when indication information is received, determining to transmit the beam failure recovery request by using the contention based PRACH resource used for beam failure recovery request, wherein the indication information is used to indicate to the terminal that the beam failure recovery request is to be transmitted by using the contention based PRACH resource used for beam failure recovery request; or in a case that it is determined that no contention-free PRACH resource is configured and the contention based PRACH resource used for beam failure recovery request is configured, determining to transmit the beam failure recovery request by using the contention based PRACH resource used for beam failure recovery request; or determining autonomously to transmit the beam failure recovery request by using the contention based PRACH resource used for beam failure recovery request.

Optionally, in an embodiment, the selecting a target contention based PRACH resource from contention based PRACH resources used for beam failure recovery request includes: determining a second candidate beam; determining a contention based PRACH resource used for beam failure recovery request associated with the second candidate beam based on a second association and a beam identification reference signal carried on the second candidate beam, wherein the second association includes the association between the beam identification reference signal and the contention based PRACH resource used for beam failure recovery request, and the second association is determined by the terminal based on a network configuration or a preset protocol; and determining the contention based PRACH resource used for beam failure recovery request associated with the second candidate beam as the target contention based PRACH resource.

Optionally, in an embodiment, the method further includes: when a beam failure event occurs, or when the beam failure recovery request is transmitted by using the target contention based PRACH resource for the first time, starting a third timer, and if the third timer expires and no response message is received from the network device, then determining that beam failure recovery based on the contention based PRACH resource used for beam failure recovery request is unsuccessful; or when the beam failure event occurs, or when the beam failure recovery request is transmitted by using the target contention based PRACH resource for the first time, starting the third counter to count a number of times the terminal transmits the beam failure recovery request by using the target contention based PRACH resource, and if the fourth number counted by the third counter reaches the preset number of transmissions and no response message is received from the network device, then determining that beam failure recovery based on the contention based PRACH resource used for beam failure recovery request is unsuccessful; wherein the fourth number is a number of times the terminal transmits the beam failure recovery request by using the target contention based PRACH resource.

Optionally, in an embodiment, after the transmitting the beam failure recovery request to the network device by using the target contention based PRACH resource, the method further includes: monitoring the response message corresponding to the beam failure recovery request on the response dedicated resource in the CORESET-BFR.

Optionally, in an embodiment, the configuration parameter of the contention based PRACH resource used for beam failure recovery request includes at least one of root sequence index, zero correlation zone, RA-preamble index config, preamble initial received target power, preamble transmission maximum number, and power ramping step.

Optionally, in an embodiment, the contention based PRACH resource used for beam failure recovery request is multiplexed with the PRACH resource for initial access through FDM, CDM, or TDM, and the contention based PRACH resource used for beam failure recovery request is multiplexed with the contention-free PRACH resource through FDM, CDM, or TDM.

Optionally, in an embodiment, the method further includes: receiving RRC signaling carrying configuration information for configuring the contention based PRACH resource used for beam failure recovery request; and determining the contention based PRACH resource used for beam failure recovery request based on the configuration information.

The terminal 500 can implement various processes implemented by the terminal in the embodiments described above. To avoid redundancy, a repeated description is omitted herein.

In some embodiments of the present disclosure, a computer readable storage medium is further provided. The computer readable storage medium has a beam failure event handling program stored thereon that, when executed by a processor, can cause the terminal to perform the method according to the embodiment shown in FIG. 1, and specifically to perform the following steps: when it is determined to transmit the beam failure recovery request by using a contention based PRACH resource used for beam failure recovery request, selecting a target contention based PRACH resource from contention based PRACH resources used for beam failure recovery request; and transmitting the beam failure recovery request to the network device by using the target contention based PRACH resource.

In conclusion, the above description only provides preferred embodiments of this disclosure, and is by no means intended to limit the scope of the present disclosure. Any modification, equivalent substitution, improvement, etc. made without departing from the spirit and principle of the present disclosure shall fall in the scope of the present disclosure.

The system, device, module or unit illustrated in the above embodiments can be specifically implemented by computer chips or entities, or by products with certain functions. A typical device for the implementation is a computer. Specifically, the computer can be, for example, a personal computer, a laptop computer, a cell phone, a camera phone, a smart phone, a personal digital assistant, a media player, a navigation device, an email device, a game console, a tablet computer, a wearable device or a combination of any of these devices.

The computer-readable medium, including permanent and non-permanent, removable and non-removable medium, can store information by any method or technology. Information can be computer readable instructions, data structures, program modules, or other data. Examples of a computer storage medium include, without limitation, phase change random access memory (PRAM), static random access memory (SRAM), dynamic random access memory (DRAM), other types of random access memory (RAM), read-only memory (ROM), electrically erasable and programmable read-only memory (EEPROM), flash memory, or other memory technologies, compact disc read-only memory (CD-ROM), digital versatile disc (DVD), or other optical storage, magnetic cassette, magnetic tape, magnetic disk or other magnetic storage, or any other non-transmission medium that can store information accessible by a computer device. As defined herein, a computer-readable medium does not include computer-readable transitory media, such as modulated data signals and carrier waves.

It should also be noted that the terms "including", "include" or any other variant thereof are intended to cover non-exclusive inclusion, so that a process, method, product or equipment including a series of elements not only includes those elements, but also includes other elements not explicitly listed, or also includes elements inherent to such a process, method, product or equipment. Without further limitations, a case in which elements are defined by the phrase "include . . . " does not exclude the existence of other identical elements in the process, method, product or equipment including these elements.

All the embodiments in this specification are described in a progressive manner, and the same and similar parts among the embodiments can be referred to each other. Each embodiment focuses on the differences from other embodiments. Particularly, for the system embodiment, since it is basically similar to the method embodiment, the description thereof is relatively simple, and relevant parts can be found in some description of the method embodiment.

What is claimed is:

1. A beam failure event handling method, applied to a terminal, comprising:
    in a case that it is determined to transmit a beam failure recovery request by using a contention based physical random access channel (PRACH) resource used for beam failure recovery request, selecting a target contention based PRACH resource from contention based PRACH resources used for beam failure recovery request; and
    transmitting the beam failure recovery request to a network device by using the target contention based PRACH resource;
    wherein the selecting the target contention based PRACH resource from contention based PRACH resources used for beam failure recovery request comprises:
    determining a second candidate beam;
    determining a contention based PRACH resource used for beam failure recovery request associated with the second candidate beam based on a second association and a beam identification reference signal carried on the second candidate beam, wherein the second association comprises an association between the beam identification reference signal and the contention based PRACH resource used for beam failure recovery request, and the second association is determined by the terminal based on a network configuration or a preset protocol; and
    determining the contention based PRACH resource used for beam failure recovery request associated with the second candidate beam as the target contention based PRACH resource.

2. The beam failure event handling method according to claim 1, further comprising:
    in a case that it is determined that a beam failure recovery based on a contention-free PRACH resource is unsuccessful, determining to transmit the beam failure recovery request by using the contention based PRACH resource used for beam failure recovery request.

3. The beam failure event handling method according to claim 2, further comprising:
    in a case that the beam failure recovery request is transmitted to the network device by using the contention-free PRACH resource, if a first timer expires and no response message is received from the network device or if a first number counted by a first counter reaches a preset number of transmissions and no response message is received from the network device, then determining that the beam failure recovery based on the contention-free PRACH resource is unsuccessful;
    wherein the first timer starts when a beam failure event occurs or when the beam failure recovery request is transmitted by using the contention-free PRACH resource for the first time; the first number is a number of times the terminal transmits the beam failure recovery request by using the contention-free PRACH resource.

4. The beam failure event handling method according to claim 3, further comprising:
    when the beam failure recovery based on the contention-free PRACH resource is unsuccessful, or when the beam failure recovery request is transmitted by using the target contention based PRACH resource for the first time, restarting the first timer, and if the first timer expires and no response message is received from the network device, then determining that a beam failure recovery based on the contention based PRACH resource used for beam failure recovery request is unsuccessful; or when the beam failure recovery based on the contention-free PRACH resource is unsuccessful, or when the beam failure recovery request is transmitted by using the target contention based PRACH resource for the first time, starting the first counter to count a number of times the terminal transmits the beam failure recovery request by using the target contention based PRACH resource, and if a second number counted by the first counter reaches the preset number of transmissions, and no response message is received from the network device, then determining that a beam failure recovery based on the contention based PRACH resource used for beam failure recovery request is unsuccessful, wherein the second number is a number of times the terminal transmits the beam failure recovery request by using the target contention based PRACH resource.

5. The beam failure event handling method according to claim 3, further comprising:

when the beam failure recovery based on the contention-free PRACH resource is unsuccessful, or when the beam failure recovery request is transmitted by using the target contention based PRACH resource for the first time, starting a second timer, and if the second timer expires and no response message is received from the network device, then determining that a beam failure recovery based on the contention based PRACH resource used for beam failure recovery request is unsuccessful; or when the beam failure recovery based on the contention-free PRACH resource is unsuccessful, or when the beam failure recovery request is transmitted by using the target contention based PRACH resource for the first time, starting a second counter to count a number of times the terminal transmits the beam failure recovery request by using the target contention based PRACH resource, and if a third number counted by the second counter reaches a preset number of transmissions and no response message is received from the network device, then determining that a beam failure recovery based on the contention based PRACH resource used for beam failure recovery request is unsuccessful;

wherein the third number is a number of times the terminal transmits the beam failure recovery request by using the target contention based PRACH resource.

6. The beam failure event handling method according to claim 1, further comprising:

in a case that it is configured to transmit the beam failure recovery request by using the contention based PRACH resource used for beam failure recovery request, determining to transmit the beam failure recovery request by using the contention based PRACH resource used for beam failure recovery request; or in a case that indication information is received, determining to transmit the beam failure recovery request by using the contention based PRACH resource used for beam failure recovery request, wherein the indication information is used to indicate to the terminal that the beam failure recovery request is to be transmitted by using the contention based PRACH resource used for beam failure recovery request; or in a case that it is determined that no contention-free PRACH resource is configured and the contention based PRACH resource used for beam failure recovery request is configured, determining to transmit the beam failure recovery request by using the contention based PRACH resource used for beam failure recovery request; or determining autonomously to transmit the beam failure recovery request by using the contention based PRACH resource used for beam failure recovery request.

7. The beam failure event handling method according to claim 6, further comprising:

when a beam failure event occurs, or when the beam failure recovery request is transmitted by using the target contention based PRACH resource for the first time, starting a third timer, and if the third timer expires and no response message is received from the network device, then determining that a beam failure recovery based on the contention based PRACH resource used for beam failure recovery request is unsuccessful; or when a beam failure event occurs, or the beam failure recovery request is transmitted by using the target contention based PRACH resource for the first time, starting a third counter to count a number of times the terminal transmits the beam failure recovery request by using the target contention based PRACH resource, and if a fourth number counted by the third counter reaches a preset number of transmissions and no response message is received from the network device, then determining that a beam failure recovery based on the contention based PRACH resource used for beam failure recovery request is unsuccessful;

wherein the fourth number is a number of times the terminal transmits the beam failure recovery request by using the target contention based PRACH resource.

8. The beam failure event handling method according to claim 1, wherein, after the transmitting the beam failure recovery request to the network device by using the target contention based PRACH resource, the method further comprises:

monitoring a response message corresponding to the beam failure recovery request on a response dedicated resource in control resource set-beam failure recovery (CORESET-BFR).

9. The beam failure event handling method according to claim 1, wherein configuration parameters for the contention based PRACH resource used for beam failure recovery request comprise at least one of:

root sequence index, zero correlation zone, random access (RA)-preamble index config, preamble initial received target power, preamble transmission maximum number, and power ramping step.

10. The beam failure event handling method according to claim 1, wherein the contention based PRACH resource used for beam failure recovery request is multiplexed with a PRACH resource for initial access through frequency division multiplexing (FDM), code division multiplexing (CDM), or time division multiplexing (TDM), and the contention based PRACH resource used for beam failure recovery request is multiplexed with the contention-free PRACH resource through FDM, CDM, or TDM.

11. The beam failure event handling method according to claim 1, further comprising:

receiving radio resource control (RRC) signaling, wherein the RRC signaling carries configuration information for configuring the contention based PRACH resource used for beam failure recovery request; and determining the contention based PRACH resource used for beam failure recovery request based on the configuration information.

12. A terminal, comprising a processor, a storage, and a beam failure event handling program stored in the storage and configured to be executed by the processor, wherein the processor is configured to execute the beam failure event handling program, to implement a beam failure event handling method, and the method comprises:
in a case that it is determined to transmit a beam failure recovery request by using a contention based physical random access channel (PRACH) resource used for beam failure recovery request, selecting a target contention based PRACH resource from contention based PRACH resources used for beam failure recovery request; and
transmitting the beam failure recovery request to a network device by using the target contention based PRACH resource;
wherein the selecting the target contention based PRACH resource from contention based PRACH resources used for beam failure recovery request comprises:
determining a second candidate beam;
determining a contention based PRACH resource used for beam failure recovery request associated with the second candidate beam based on a second association and a beam identification reference signal carried on the second candidate beam, wherein the second association comprises an association between the bean identification reference signal and the contention based PRACH resource used for beam failure recovery request, and the second association is determined by the terminal based on a network configuration or at preset protocol, and
determining the contention based PRACH resource used for beam failure recovery request associated with the second candidate beam as the target contention based PRACH resource.

13. The terminal according to claim 12, wherein the processor is further configured to execute the beam failure event handling program, to implement following step:
in a case that it is determined that a beam failure recovery based on a contention-free PRACH resource is unsuccessful, determining to transmit the beam failure recovery request by using the contention based PRACH resource used for beam failure recovery request.

14. The terminal according to claim 13, wherein the processor is further configured to execute the beam failure event handling program, to implement following step:
in a case that the beam failure recovery request is transmitted to the network device by using the contention-free PRACH resource, if a first timer expires and no response message is received from the network device or if a first number counted by a first counter reaches a preset number of transmissions and no response message is received from the network device, then determining that the beam failure recovery based on the contention-free PRACH resource is unsuccessful;
wherein the first timer starts when a beam failure event occurs or when the beam failure recovery request is transmitted by using the contention-free PRACH resource for the first time; the first number is a number of times the terminal transmits the beam failure recovery request by using the contention-free PRACH resource.

15. The terminal according to claim 12, wherein the processor is further configured to execute the beam failure event handling program, to implement following steps:
in a case that it is configured to transmit the beam failure recovery request by using the contention based PRACH resource used for beam failure recovery request, determining to transmit the beam failure recovery request by using the contention based PRACH resource used for beam failure recovery request; or
in a case that indication information is received, determining to transmit the beam failure recovery request by using the contention based PRACH resource used for beam failure recovery request, wherein the indication information is used to indicate to the terminal that the beam failure recovery request is to be transmitted by using the contention based PRACH resource used for beam failure recovery request; or
in a case that it is determined that no contention-free PRACH resource is configured and the contention based PRACH resource used for beam failure recovery request is configured, determining to transmit the beam failure recovery request by using the contention based PRACH resource used for beam failure recovery request; or
determining autonomously to transmit the beam failure recovery request by using the contention based PRACH resource used for beam failure recovery request.

16. A non-transitory computer readable storage medium storing therein a beam failure event handling program, wherein the beam failure event handling program is configured to be executed by a processor, to implement a beam failure event handling method, and the method comprises:
in a case that it is determined to transmit a beam failure recovery request by using a contention based physical random access channel (PRACH) resource used for beam failure recovery request, selecting a target contention based PRACH resource from contention based PRACH resources used for beam failure recovery request; and
transmitting the beam failure recovery request to a network device by using the target contention based PRACH resource;
wherein the selecting the target contention based PRACH resource from contention based PRACH resources used for beam failure recovery request comprises;
determining a second candidate beam,
determining a contention based PRACH resource used for beam failure recovery request associated with the second candidate beam based on a second association and a beam identification reference signal carried on the second candidate beam, wherein the second association comprises an association between the beam identification reference signal and the contention based PRACH resource used for beam failure recovery request, and the second association is determined by the terminal based on a network configuration or a preset protocol; and
determining the contention based PRACH resource used for beam failure recovery request associated with the second candidate beam as the target contention based PRACH resource.

17. The non-transitory computer readable storage medium according to claim 16, wherein the method further comprises:
in a case that it is determined that a beam failure recovery based on a contention-free PRACH resource is unsuccessful, determining to transmit the beam failure recovery request by using the contention based PRACH resource used for beam failure recovery request.

18. The non-transitory computer readable storage medium according to claim 17, wherein the method further comprises:

in a case that the beam failure recovery request is transmitted to the network device by using the contention-free PRACH resource, if a first timer expires and no response message is received from the network device or if a first number counted by a first counter reaches a preset number of transmissions and no response message is received from the network device, then determining that the beam failure recovery based on the contention-free PRACH resource is unsuccessful;

wherein the first timer starts when a beam failure event occurs or when the beam failure recovery request is transmitted by using the contention-free PRACH resource for the first time; the first number is a number of times the terminal transmits the beam failure recovery request by using the contention-free PRACH resource.

19. The non-transitory computer readable storage medium according to claim 16, wherein the method further comprises:

in a case that it is configured to transmit the beam failure recovery request by using the contention based PRACH resource used for beam failure recovery request, determining to transmit the beam failure recovery request by using the contention based PRACH resource used for beam failure recovery request; or in a case that indication information is received, determining to transmit the beam failure recovery request by using the contention based PRACH resource used for beam failure recovery request, wherein the indication information is used to indicate to the terminal that the beam failure recovery request is to be transmitted by using the contention based PRACH resource used for beam failure recovery request; or in a case that it is determined that no contention-free PRACH resource is configured and the contention based PRACH resource used for beam failure recovery request is configured, determining to transmit the beam failure recovery request by using the contention based PRACH resource used for beam failure recovery request; or determining autonomously to transmit the beam failure recovery request by using the contention based PRACH resource used for beam failure recovery request.

* * * * *